United States Patent [19]

Dahlbeck et al.

[11] 4,136,408
[45] Jan. 30, 1979

[54] LIGHTWEIGHT REMOVABLE COVER FOR A POOL, GREENHOUSE OR THE LIKE

[76] Inventors: Edwin L. Dahlbeck; Verna H. Dahlbeck, both of 739 N. 198th, Seattle, Wash. 98133

[21] Appl. No.: 744,729
[22] Filed: Nov. 24, 1976
[51] Int. Cl.² .................. E04H 3/16; E04H 3/18; E03C 1/00
[52] U.S. Cl. ................................................ 4/172.12
[58] Field of Search ............... 4/172.12, 172.11; 52/2; 135/1

[56] References Cited

U.S. PATENT DOCUMENTS

| | | | |
|---|---|---|---|
| 826,294 | 7/1906 | Waldschmidt | 24/243 B |
| 831,743 | 9/1906 | Reams | 24/243 B |
| 1,150,046 | 8/1915 | Lloyd | 24/243 B X |
| 1,389,587 | 9/1921 | Hilborn | 24/243 B |
| 1,726,790 | 9/1929 | Andrews | 24/243 B X |
| 2,964,759 | 12/1960 | Riggs | 4/172.12 |
| 3,423,767 | 1/1969 | Crook | 4/172.12 |
| 3,461,890 | 8/1969 | Goodrich | 4/172.12 X |
| 3,512,186 | 5/1970 | Sanford | 4/172.12 |
| 3,534,412 | 10/1970 | Crook | 4/172.12 |
| 3,683,427 | 8/1972 | Burkholz et al. | 4/172.12 |

Primary Examiner—Henry K. Artis
Attorney, Agent, or Firm—Seed, Berry, Vernon & Baynham

[57] ABSTRACT

Interfitted tubular supports are connected centrally above an enclosure such as a pool, above or below ground, or a greenhouse and are connected at their lower ends to a peripheral rail surrounding the enclosure. The supports are connected to the peripheral rail preferably by clamping a horizontal tubular member to the flat top wall of the rail or alternatively, by individually clamping a plurality of spaced blocks lying on the flat top wall of the rail. A flexible plastic cover is fitted over the tubular supports and is releasibly clamped to the vertical sidewall of the rail by peripherally spaced clamping or pinching members. In one embodiment, especially for larger enclosures, the tubular truss support members are employed and support members all are interconnected by tubular stabilizing members as well as with guy lines. Some of the embodiments have a tubular ridge member which terminates above the peripheral rail at a height high enough to allow entry by a standing child or an adult.

11 Claims, 21 Drawing Figures

LIGHTWEIGHT REMOVABLE COVER FOR A POOL, GREENHOUSE OR THE LIKE

BACKGROUND OF THE INVENTION

Field of the Invention

Flexible covers for swimming pools, greenhouses and the like have been known heretofore. Examples of such covers are shown in U.S. Pat. Nos. 3,766,573, 3,461,890, 2,953,145 and 3,683,427. The object of all of the patented structures is to provide a low-cost cover so that the user can afford to keep the pool, for example covered during inclement weather and to keep debris out of the pool. These patented covers, however, are generally not commercially satisfactory since they are expensive to manufacture and are difficult to remove during good weather and erect during inclement weather.

SUMMARY OF THE INVENTION

It is an object of this invention to provide an inexpensive, easily removable cover for a swimming pool, greenhouse or the like of the type which has a peripheral rail for securing the cover.

It is another object of this invention to provide supports for a flexible cover which are easily adaptable to a large variety of sizes and shapes.

It is another object of this invention to provide a cover for an enclosure such as a pool or a greenhouse which can be manually attached to the peripheral rail surrounding the enclosure.

Basically these objects are obtained by using a plurality of telescopically interfitted plastic or metal tubular supports which are interconnected at the top of the enclosure and connected to a peripheral rail surrounding the enclosure in a unique manner. The lower ends of the tubular supports are connected to the peripheral rail which has a flat, top wall and a vertical sidewall, by providing a peripheral tubular support with upright T sections that interfit into the lower ends of the tubular supports coming from above the enclosure. In a second embodiment the lower ends of the tubular members are fitted into peripherally spaced blocks which sit on the flat, top wall of the peripheral rail. In both embodiments the tubular peripheral support or the blocks are clamped to the vertical sidewall of the rail such that they are pressed tightly against the flat, top wall but can be removed without the need for any special tools merely by unclamping. The flexible cover is also releasibly attached to the rail between the rail vertical wall and pinching washers attached to the vertical wall. In one embodiment for exceptionally large pools, a second set of tubular supports or truss supports lie in an arcuate co-planar position below an upper set of tubular supports for additional strength. In addition, in this large embodiment, stabilizing tubular members coupled to each of the tubular supports and guy lines are provided for additional lengthwise stability. In some embodiments a ridge support terminates above the peripheral rail to form an entry way into the enclosure.

DETAILED DESCRIPTION OF THE PREFERRED EMBODIMENTS

Figure 1:
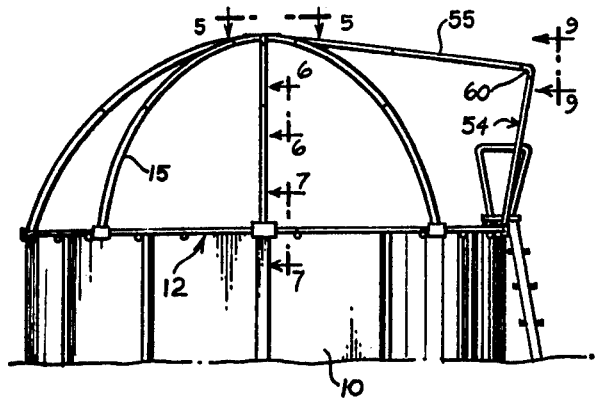
FIG. 1 is a side elevation of one preferred embodiment of an above-ground pool.
Figure 2:
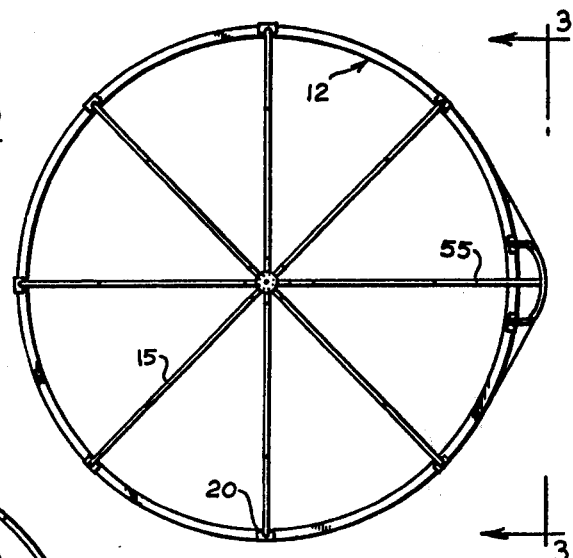
FIG. 2 is a plan of the enclosure shown in FIG. 1.
Figure 3:
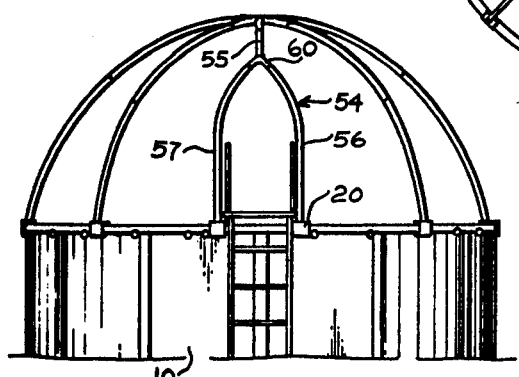
FIG. 3 is a front elevation of the enclosure shown in FIG. 1.
Figure 4A:
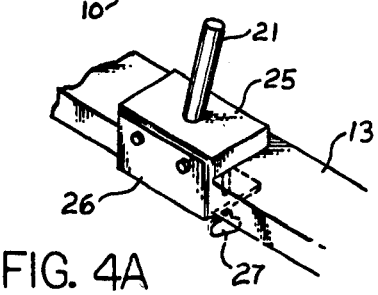
FIG. 4 is an isometric detail of one clamping member.
Figure 4:
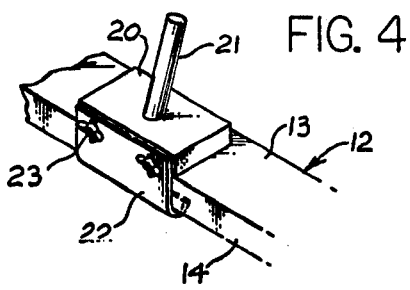
Figure 5:
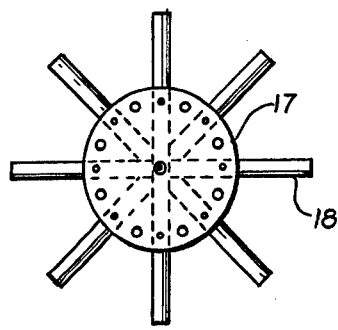
FIG. 5 is a fragmentary plan of a hub device for attaching the tubular support members of the embodiment of FIG. 1.
Figure 6:
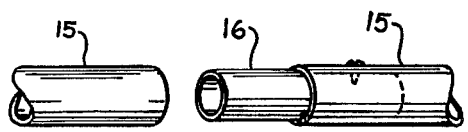
FIG. 6 illustrates one form of connection for the tubular supports.
Figure 5A:
FIG. 5A is a side elevation of the hub device shown in FIG. 5.

An above-ground swimming pool or greenhouse cover is shown in FIGS. 1-3 and includes the conventional sidewall of a pool 10 with its conventional peripheral rail 12 having a flat, top wall 13 and a vertical sidewall 14. Tubular plastic support members 15 are interconnected by dowels 16 which are screwed or nailed to the tubular supports. The upper ends of the tubular supports are connected by dowels in a hub 17 having a plurality of tubes 18. The lower ends of the tubular supports are attached to the peripheral rail in one embodiment shown in FIG. 4 by a plurality of spaced blocks 20 each with an upstanding dowel 21 glued and screwed at an angle as shown. The blocks are pulled against the flat, top wall by sidewall clamps 22 that hook under the lower edge of the vertical sidewall and are adjustibly clamped in position by wing nuts 23. In a second embodiment shown in FIG. 4A spaced blocks 25 are coupled to the flat, top wall 13 by clamps 26 which underlie the top flat wall and abut against the vertical sidewall. Thumbscrews 27 hold the clamps 26 against the rail by abutting against the underside of the top, flat wall.

Figure 10:
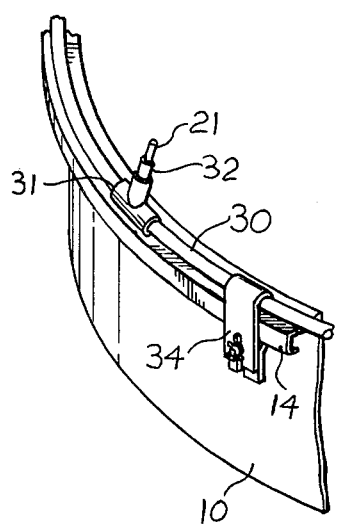
FIG. 10 is another embodiment for fastening the tubular supports to the peripheral rail of the enclosure.
Figure 11:
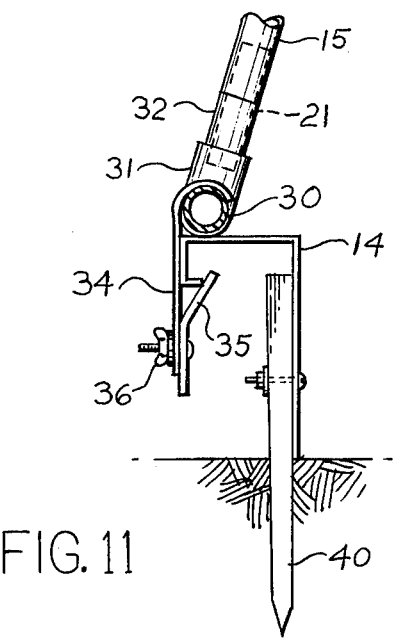
FIG. 11 is a view similar to FIG. 8 but showing the clamping member of FIG. 10 for use with a peripheral rail attached to the ground.

In FIGS. 10 and 11 a modified embodiment is illustrated. In this embodiment, a peripheral tubular support 30 is interconnected by T-shaped pipe members 31 in which is fitted a short piece of pipe 32 and a dowel 21. The dowel 21 fits in the lower ends of the tubular supports 15. The peripheral tubular support 30 is pressed against the flat, top wall 13 by clamps 34. The clamps 34 include a lower clamping piece 35 that is slid up tightly against the lower edge of the vertical sidewall 14 and wing nuts 36 hold the lower clamping member in place.

Figure 8:
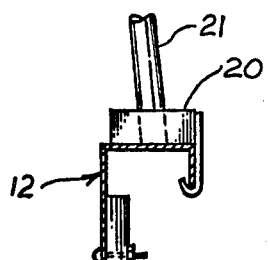
FIG. 8 is another embodiment showing a peripheral rail of an enclosure fastened to the ground.
Figure 8:
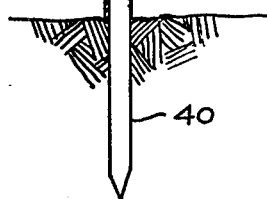

In FIG. 8 the rail 12 is secured directly to the ground by posts or pegs 40. Thus the same tubular support fastening means is usable for below ground pools or enclosures as is used for the above-ground pools.

Figure 12:
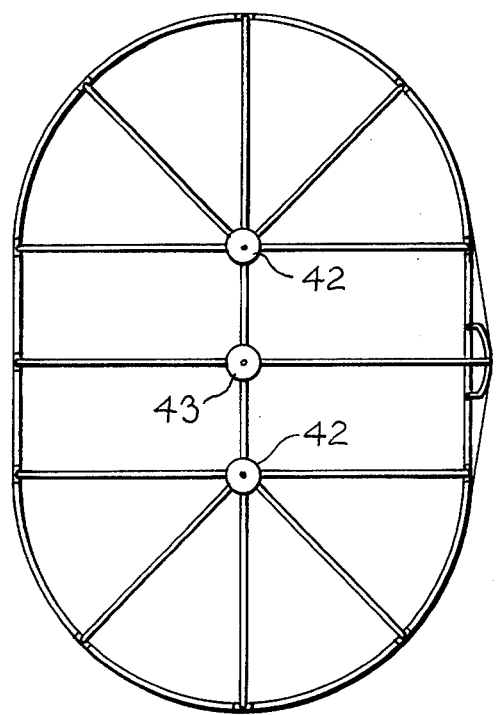
FIG. 12 is a fragmentary vertical section of a modified form of covering support for large enclosures.
Figure 12A:
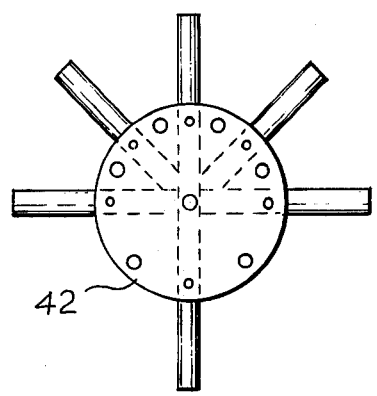
FIGS. 12A and 12B are modified hub devices for the enclosure of FIG. 12.
Figure 12B:
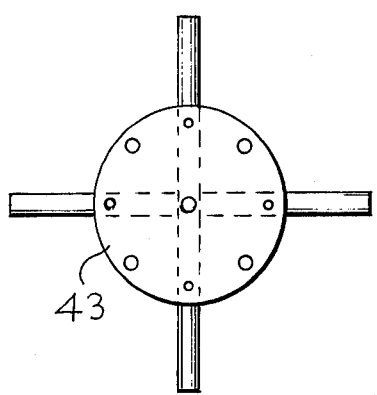
Figure 13:
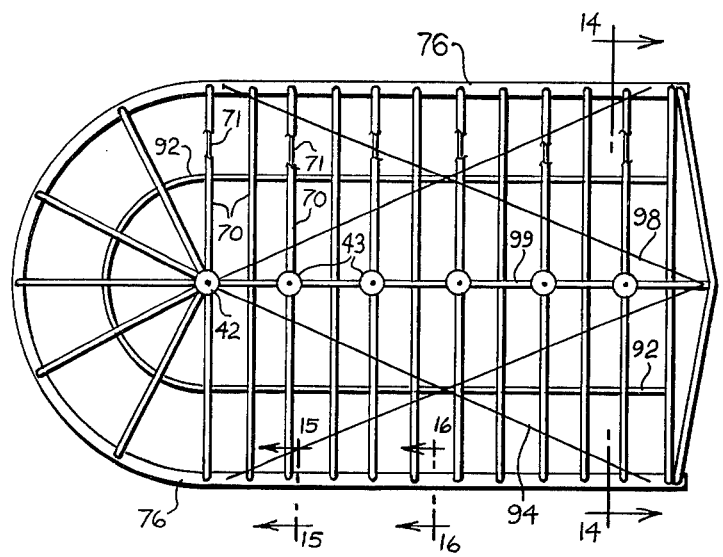
FIG. 13 is a modified enclosure for large pools.
Figure 14:
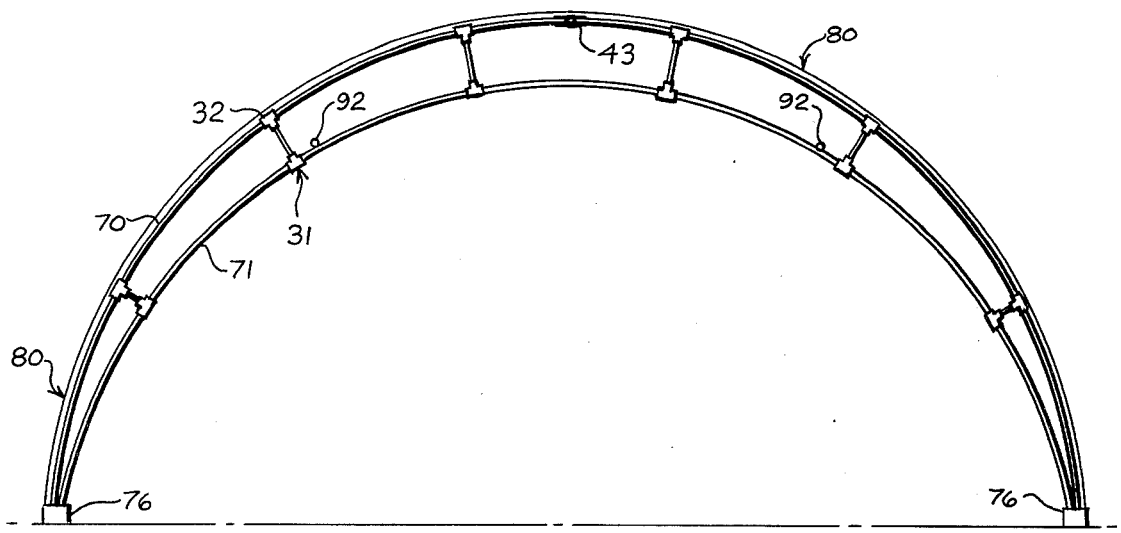
FIG. 14 is a transverse fragmentary section of the enclosure of FIG. 13.
Figure 15:
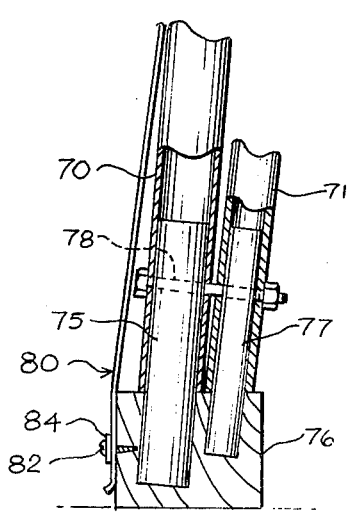
FIG. 15 is a detail for connecting tubular supports to the ground in the embodiment of FIG. 13.
Figure 16:
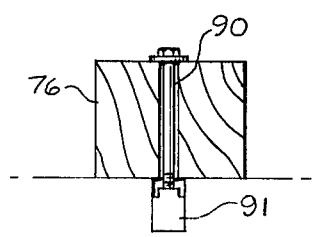
FIG. 16 is a detail for attaching the peripheral rail to the ground in the device shown in FIG. 13.

FIGS. 12A and 12B illustrate modified hubs. FIG. 12 illustrates a hub 42 which is used at the ends of an oval pool. Hub 43 is used in the center of an oval pool. Such an oval pool is shown in FIG. 12.

Figure 7:
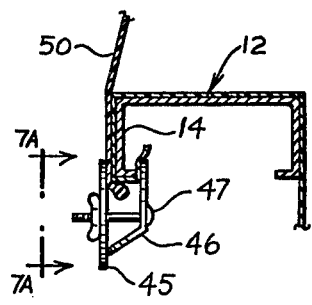
FIG. 7 is a fragmentary vertical section showing a means for clamping the flexible cover to the peripheral rail of the enclosure.
Figure 7A:
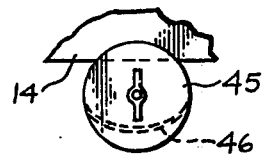
FIG. 7A is a front elevation of the clamping members shown in FIG. 7.

The covering 50 for the pool is of a heavy-duty vinyl plastic which is fitted snugly over the tubular supports and coupled at its lower, peripheral edge to the peripheral rail 12. For this purpose a set of washers 45 and 46 (FIGS. 7 and 7A) are connected against the lower edge of the sidewall 14 by wing nuts 47. Washer 46 is bent so that as the washers are pulled together by the wing nut, the vinyl covering 50 is pinched between the washer 45 and the vertical sidewall 14.

Figure 9:
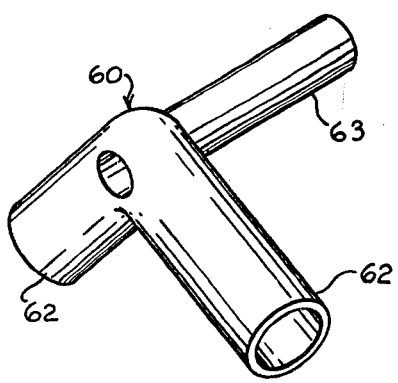
FIG. 9 is a fragmentary end elevation looking at one component of a ridge support connection over the door frame of the enclosure shown in FIG. 1.

In each of the above-ground pools an entrance way 54 (FIGS. 1-3) is provided. The entrance way is formed from an elongated ridge support 55 which terminates at a substantial distance above the peripheral rail 12. Two support members 56 and 57 connect to the blocks 20 (or tubular peripheral member 30) and converge upwardly to connect with the ridge support 55. For this purpose a connector 60 (FIG. 9) having two hollow legs 62 and a short dowel 63 interfit respectively over the tubular members 56 and 57 and within the tubular support 55. All of these members can be screwed or nailed together as needed.

As best shown in FIGS. 12 to 16 modified forms of support for enlarged enclosures are illustrated. In these embodiments a hub such as shown in FIG. 12 connects tubular supports 70 at the curved ends of the pool and additional hubs as in FIG. 12B connect tubular supports 70 along the length of the enclosure. The tubular supports are of the same material as in the other embodiments but are coupled together by T sections 31 (FIG. 14) joined by a common dowel which fits into pipes 32 making up the T. A second set of smaller supports 71 connected to the other T sections lie in a common plane and in a smaller arc than the supports 70 to form a truss for increased strength. In the preferred embodiment the truss or smaller tubular supports are used with alternate tubular supports 70 along the length of the part. The tubular supports 70 fit at their lower ends over plastic dowels 75 which are fitted within a wooden or tubular peripheral rail 76. The inner supports 71 fit over dowels 77 which are also embedded in the peripheral rail. Bolts 78 interconnect the inner supports 71, dowels and outer supports 70. The vinyl cover 80 is fastened to the wooden rail by screws 82 and washers 84. The peripheral rail is secured to the ground or concrete by bolts 90 which fit in enlarged nuts 91 that are cemented or tamped into place in the concrete or attached to the ground by stakes as in FIG. 8. Access to the cover is achieved through a zipper opening or door not shown. The supports and trusses are further stabilized by elongated tubular members 92 that are bolted to each of the tubular supports 71. The tubular supports 92 provide stabilization against movement of the tubular support members. Additionally, a set of guy wires 94 start from the top hub 42 and are connected to the peripheral rail 76 by screws not shown. Second guy wires 98 start at the ridge pole 99 which runs the length of the pool at the upper end thereof and then connects to the peripheral rail 76 at the opposite end of the pool. The stabilizing guy wires also assist in providing lengthwise stability to the enclosure.

The embodiments of the invention in which a particular property or privilege is claimed are defined as follows:

1. Apparatus for supporting a flexible cover over an enclosure such as a swimming pool, greenhouse or the like, comprising:
    a peripheral lower frame having an outer surface,
    a plurality of curved, interconnected tubular supports coupled to the lower frame overlying the enclosure and spaced along the length thereof,
    a plurality of generally parallel elongated rigid stabilizer members located above the peripheral lower frame and interconnecting said tubular supports for rigidifying the supports, one of said stabilizers including a central ridge pole running along the top of the curvature of the tubular supports and, flexible guy lines coupled to the top of the supports adjacent to each end of the enclosure and coupled at lower ends to said peripheral frame adjacent opposite ends of the enclosure for stabilizing against lengthwise movement,
    a flexible cover overlying said lines, supports, stabilizer members and flexible guy lines for covering the space above the enclosure, and
    means for securing the cover to the lower frame.

2. Apparatus for supporting a flexible cover over an enclosure such as a swimming pool, greenhouse or the like, comprising:
    a peripheral lower frame having an outer surface,
    a plurality of curved, interconnected tubular supports coupled to the lower frame overlying the enclosure and spaced along the length thereof,
    rigid stabilizer members located above the peripheral lower frame and interconnecting said tubular supports for rigidifying the supports, one of said stabilizers including a central ridge pole running along the top of the curvature of the tubular supports and, flexible guy lines coupled to the top of the supports adjacent to each end of the enclosure and coupled at lower ends to said peripheral frame adjacent opposite ends of the enclosure for stabilizing against lengthwise movement,
    a flexible cover overlying said lines, supports, stabilizer members and flexible guy lines for covering the space above the enclosure, and
    means for securing the cover to the lower frame, said tubular supports each including two differently curved interconnected tubes lying in a common vertical plane and having rigid braces interconnecting the tubes in said plane for forming trusses in said planes.

3. Apparatus for supporting a flexible cover over an enclosure such as a swimming pool, greenhouse or the like, comprising:
    a peripheral lower frame having an outer surface,
    a plurality of curved, interconnected tubular supports coupled to the lower frame overlying the enclosure and spaced along the length thereof,
    rigid stabilizer members located above the peripheral lower frame and interconnecting said tubular supports for rigidifying the supports, one of said stabilizers including a central ridge pole running along the top of the curvature of the tubular supports and, flexible guy lines coupled to the top of the supports adjacent to each end of the enclosure and coupled at lower ends to said peripheral frame adjacent opposite ends of the enclosure for stabilizing against lengthwise movement, a flexible cover overlying said lines, supports, stabilizer members and flexible guy lines for covering the space above the enclosure, and means for securing the cover to the lower frame, said means for securing the cover to the lower frame including a plurality of fasteners spaced along the peripheral lower frame, said fasteners including inner and outer pinching members, a fastener body releasably clamping said pinching members against spaced opposed surfaces of the peripheral lower frame, one of said pinching members having a lower end bent toward the other pinching member on the end of the pinching member remote from the lower frame for engaging the other pinching member, and wherein the flexible cover is clamped between the outer surface of the peripheral lower frame and said outer pinching member.

4. Apparatus for supporting a flexible cover over an enclosure such as a swimming pool, greenhouse or the like, of the type having a generally rectangular peripheral rail, said rail including a flat, top wall and an outer vertical wall terminating in a lower flange, the improvement comprising:

a plurality of spaced axially interfitted tubular supports overlying the enclosure, rigid means rigidly joining the spaced supports generally centrally above the enclosure, a flexible cover coupled to the rail and fitted over said supports to cover the enclosure, means for securing the supports to the rail, said support securing means including a first clamp member lying on the flat, top wall of the rail and having upwardly directed appendages for fitting onto and releasably holding said tubular supports, and a second clamp member releasably holding said first clamp member against the flat, top rail, said second clamp member gripping the vertical sidewall of the rail, and means for manually adjusting and holding the relative positions between the first and second clamp members and the top and sidewalls of the rail for gripping the clamp members onto the rail, said first clamp member including a tubular body, said second clamp member including a curved hook engaging said tubular body, said manual adjusting means including a plate bent upwardly away from said second clamp member forming a V with said first clamp member and being vertically adjustable along said second clamp member toward and away from said first clamp member for gripping the rail therebetween, means for releasably locking the plate and second clamp member together, and wherein said V engages the outer vertical wall lower flange and can be rocked around the flange for releasing said first member to remove the flexible cover.

5. The apparatus of claim 4, said first clamp member tubular body including a horizontal peripheral tubular support lying on the flat, top wall of the rail, said hook gripping the peripheral tubular support and pressing it against the top wall.

6. The apparatus of claim 4, said first clamp member including a plurality of peripherally spaced blocks lying on the flat, top wall of the rail.

7. The apparatus of claim 4, including a tubular ridge member terminating at one end above the rail, a tubular door frame connected to said means for securing the supports to the rail and to said one end of said ridge member, said tubular door frame including two long peripherally spaced upright frame members converging at said ridge member whereby the door frame is of a vertical height above the remaining curvature of the tubular supports and flexible cover for easy entry.

8. The apparatus of claim 4, said enclosure lying below ground and wherein said peripheral rail includes post means embedded in the ground for anchoring the peripheral rail and means connecting the rail to said post means.

9. The apparatus of claim 4, the coupling of the flexible cover to the rail including inner and outer pinching members, a fastener releasibly clamping said pinching members against spaced opposed surfaces of the lower flange of the outer vertical wall, one of said pinching members having a lower end bent toward the other pinching member on the end of the pinching member remote from the rail lower flange for engaging the other pinching member, and wherein said flexible cover is clamped between the rail vertical wall and said outer pinching member.

10. Apparatus for supporting a flexible cover over an enclosure such as a swimming pool, greenhouse or the like of the type having a generally rectangular peripheral rail, said rail including a flat, top wall, an outer vertical wall, said outer vertical wall terminating in a lower flange, the improvement comprising:

a plurality of spaced axially interfitted upper tubular supports overlying the enclosure, means rigidly joining the space supports generally centrally above the enclosure, a flexible cover coupled to the rail and fitted over said supports to cover the enclosure, a lower tubular support interconnected to said upper tubular supports and adapted to rest on the flat top wall of the rail, a plurality of hook members engaging the lower tubular supports and each having a leg extending downwardly over the outer vertical wall of the rail and terminating below the lower flange of the rail, a plurality of plate members each engaging the inside of the leg of said hook member and having a bent upper portion bent away from the leg member to form a V, means for releasably holding the plate member in a vertical position relative to the leg member for engaging the lower flange of the rail between the leg and plate member formed V whereby the hook member can be swung off the lower tubular support for releasing the lower tubular support merely by pivoting the hook member about the lower flange of the rail.

11. Apparatus for supporting a flexible cover over an enclosure such as a swimming pool, greenhouse or the like, of the type having a generally rectangular peripheral rail, and an elongated vertical pool sidewall which supports the rail a considerable distance above the ground, the improvement comprising:

a plurality of spaced axially interfitted tubular supports overlying the enclosure, means rigidly joining the spaced supports above the enclosure, a flexible cover coupled to the rail and fitted over said supports to cover the enclosure, means for securing the supports to the rail, a tubular ridge member terminating at one end above the rail and connected to said tubular supports, a tubular door frame connected to said tubular ridge member and including two long peripherally spaced upright frame members converging at said tubular ridge member whereby the door frame is of a vertical height above the rail for easy entry, and wherein the flexible cover encircles the tubular door frame and is spaced from the rail by the door frame so that a ladder of the type which straddles the rail on either side of the sidewall of the pool can be left in place whether the cover is opened or closed.

* * * * *